United States Patent [19]

Dorr et al.

[11] Patent Number: 4,535,973
[45] Date of Patent: Aug. 20, 1985

[54] VEHICLE TIRE CARRIER

[75] Inventors: William C. Dorr, Jackson; Kenneth C. Hybarger, Belmont; James A. Yurkinas, South Haven, all of Mich.

[73] Assignee: Kent Products, Inc., Grand Haven, Mich.

[21] Appl. No.: 569,996

[22] Filed: Jan. 11, 1984

[51] Int. Cl.³ .............................................. B62D 43/04
[52] U.S. Cl. .................... 254/323; 224/42.12; 254/270; 254/903; 414/463
[58] Field of Search .............. 254/270, 323, 376, 271, 254/389, 903; 242/86.5 R; 414/463; 224/42.12; 74/576, 578

[56] References Cited

U.S. PATENT DOCUMENTS

| | | | |
|---|---|---|---|
| 2,661,405 | 12/1953 | Western | 254/270 X |
| 2,688,372 | 9/1954 | Walker | 180/1 |
| 3,372,821 | 3/1968 | Podhajsky | 414/463 |
| 3,395,819 | 8/1968 | Fruetel | 414/463 |
| 3,542,413 | 11/1970 | Hardison | 294/86 |
| 3,734,323 | 5/1973 | Price et al. | 414/463 |
| 3,856,167 | 12/1974 | Yasue et al. | 414/463 |
| 3,865,264 | 2/1975 | Kuhns | 414/463 |
| 3,874,536 | 4/1975 | Watanabe | 414/463 |
| 4,059,197 | 11/1977 | Iida | 414/463 |

Primary Examiner—Stuart S. Levy
Assistant Examiner—Katherine Jaekel
Attorney, Agent, or Firm—Beaman & Beaman

[57] ABSTRACT

A vehicle spare tire carrier utilizing a winch for holding the tire against the vehicle underside, wherein the winch employs apparatus for preventing the cable sheave from being rotated in the improper direction for winding the tire supporting cable thereon. Winch stop means sensing the location of the cable relative to the sheave prevents winch rotation upon the cable being fully extended. Also, an embodiment of the tire carrier utilizes a cable guide and extension for remotely locating the winch from the location of tire support.

5 Claims, 15 Drawing Figures

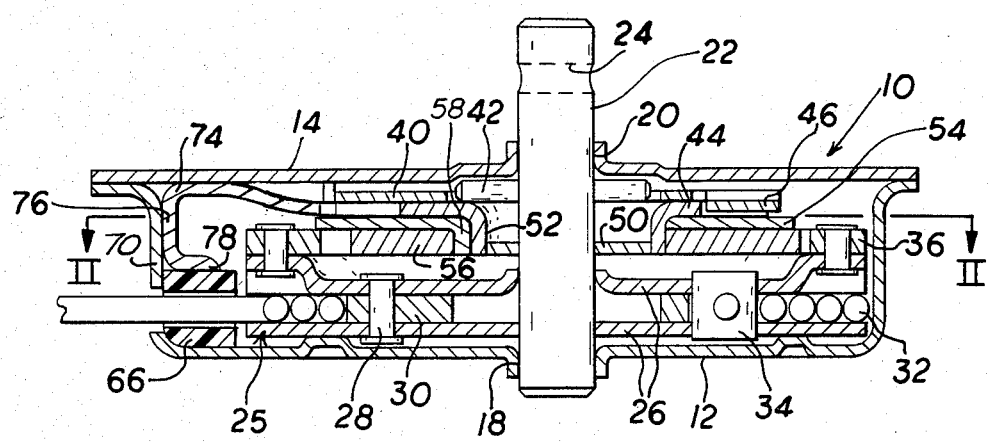
Fig_1_
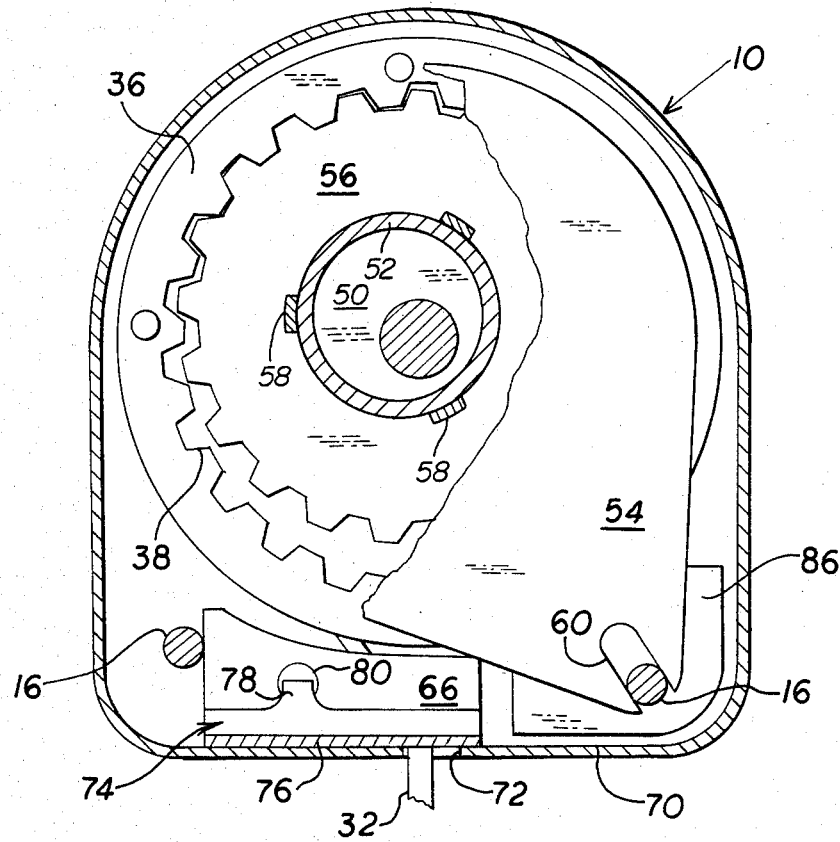
Fig_2_

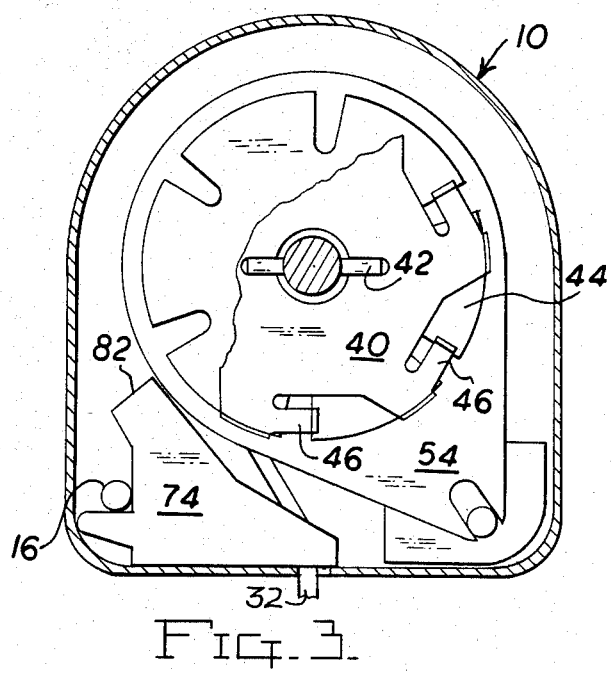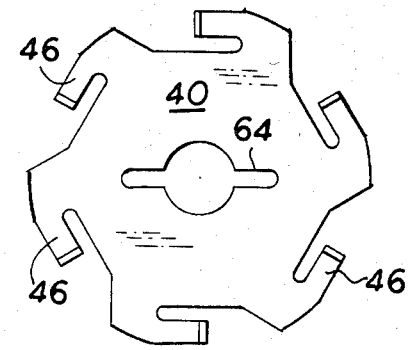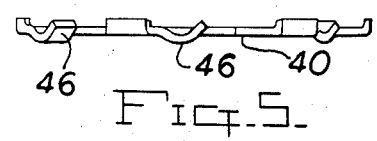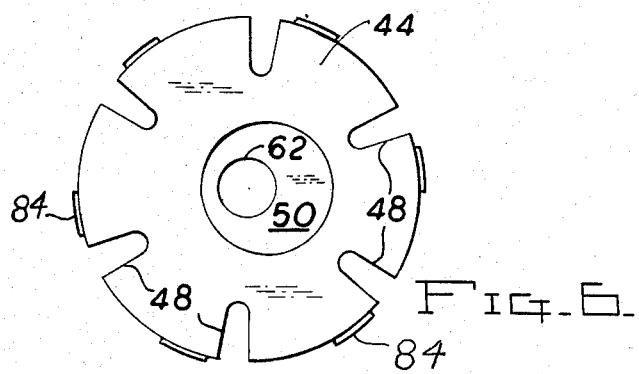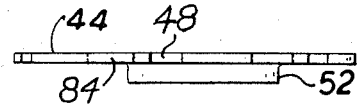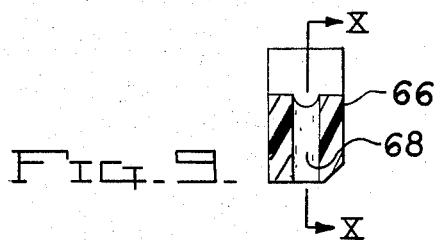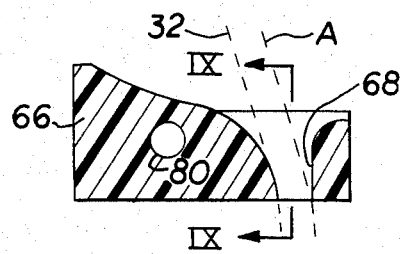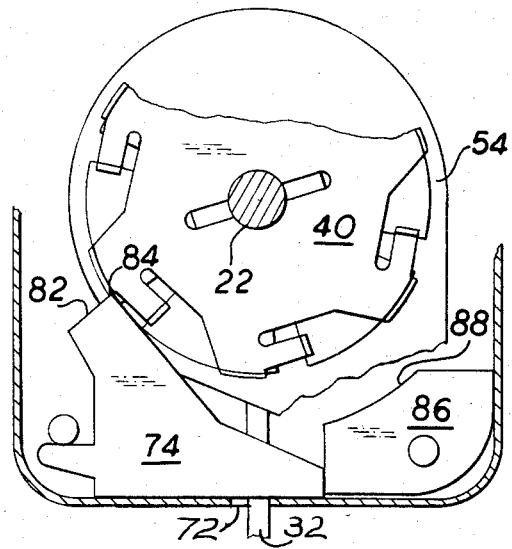

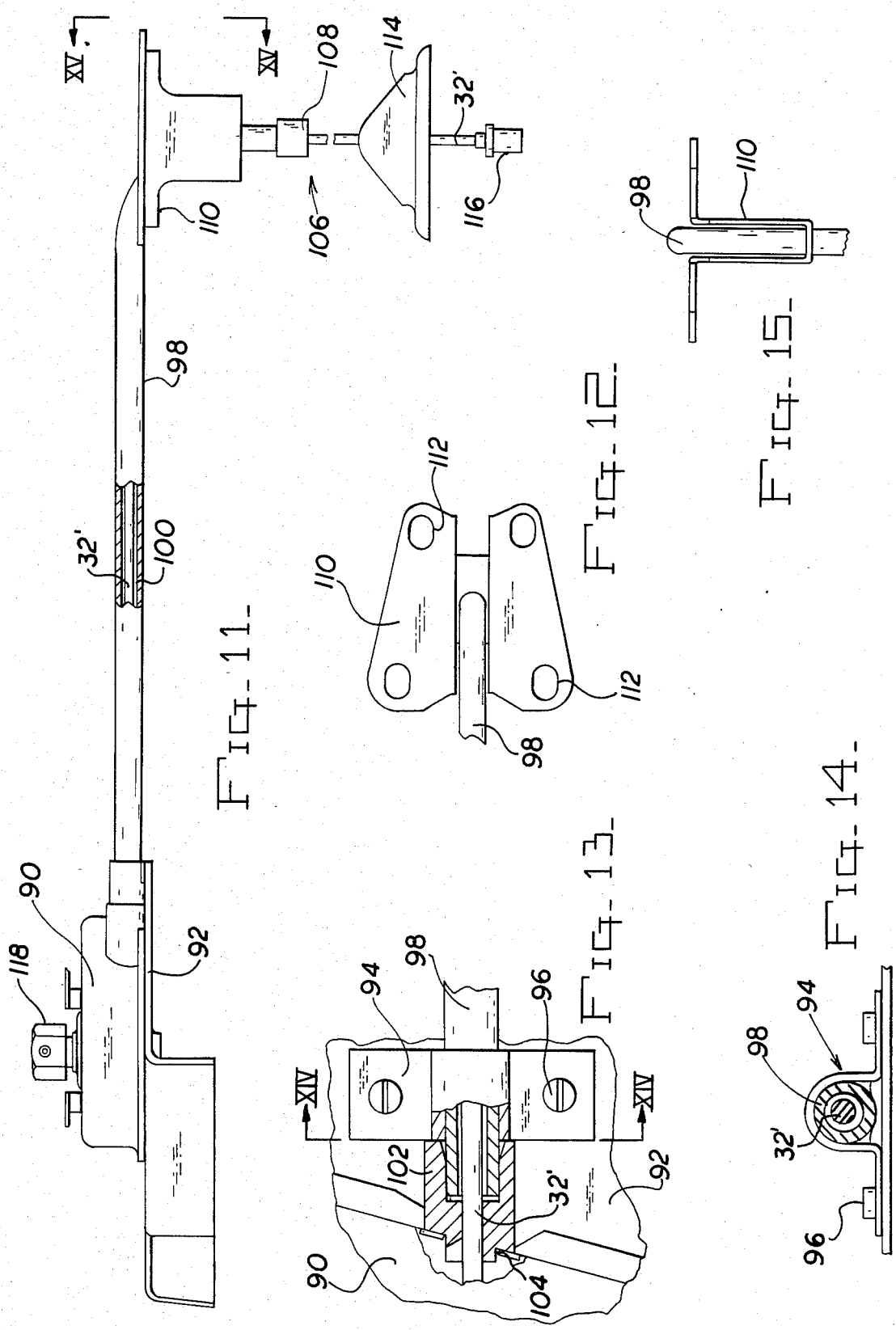

VEHICLE TIRE CARRIER

BACKGROUND OF THE INVENTION

The design of certain types of vehicle body styles necessitates the storage of the spare tire under the vehicle, and this mode of spare tire storage is of particular advantage with compact pickup trucks and other utility vehicles. In such installations winch means are mounted upon the vehicle upon which a cable is wound, and a spare tire is attached to the free end of the cable and drawn upwardly against the vehicle undercarriage for storage purposes. When the spare tire is required, the winch is "unwound" lowering the tire to the ground for access and use.

Devices of the aforedescribed type are shown in U.S. Pat. Nos. 2,688,372; 3,542,413; 3,372,821; 3,395,819; 3,734,323; 3,856,167; 3,874,536 and 4,059,197.

Present tire carriers of the type generally described in the aforementioned patents primarily utilize winch drives of the general construction shown in U.S. Pat. No. 4,059,197 wherein an eccentric gear arrangement is employed to provide a mechanical advantage in the operation of the winch. However, known under-vehicle tire carriers may malfunction due to difficulty with the winding of the cable upon the winch sheave. For instance, if the winch is rotated in the improper direction difficulty occurs in raising the tire in the proper manner, and if the tire is not snugly drawn against its supporting surfaces excessive wear and noise occur and the possibility of inadvertently releasing the spare tire is present.

It is most important that tire carrier apparatus of the aforedescribed type be dependable in operation, yet simple in construction and function, as the apparatus is not readily accessible to the user, and must be automatically capable of performing its desired function once the crank has been attached thereto.

Also, as the most desirable location for under-vehicle tire storage may be remote from the rear of the vehicle, which is the location from where the winch is usually operated, difficulty is often encountered in attaching the manual crank to the winch, and present constructions limit the location of tire storage due to the necessity for easily attaching the manually operated winch crank to the winch driveshaft.

It is an object of the invention to provide a winch type tire carrier utilizing a cable wound upon a sheave wherein the winch sheave is prevented from being rotated in a nonoperative direction.

Another object of the invention is to provide a tire carrier winch system utilizing a cable wound upon a sheave wherein the orientation of the cable to the sheave is sensed, and upon the cable being fully extended, stop means prevent winding of the sheave in the improper direction.

Another object of the invention is to provide a winch type tire carrier with an anti-rotation sheave lock which is of a concise configuration and automatically prevents excessive winch sheave rotation of sheave winding in the improper direction.

A further object of the invention is to provide a winch type tire carrier with torque limiting means to prevent excessive cable stress during tire storage.

Yet another object of the invention is to provide a winch type tire carrier utilizing a cable wound upon a sheave wherein a cable extension and guide permits tire storage at a location remote from the winch.

In the practice of the invention a concise low cost winch mounted within a sheet metal housing is attached to the underside of a motor vehicle. By means of a manual crank attachable to the winch driveshaft, the winch may be operated to lower a spare tire from a storage position engaging the vehicle undercarriage to an access position upon the tire being lowered to the ground. Gear reduction means of an eccentric type provide the winch with a high mechanical advantage, and the invention utilizes cable position sensing means to prevent rotation of the cable winch in an improper direction during cable retrieval.

The cable extends through an opening in the winch housing, and a cable sensing block within the housing through which the cable passes maintains a predetermined orientation to the housing as the cable is wound and unwound with respect to the winch. However, upon the cable being fully extended, and attempted rotation of the winch sheave in the improper direction for cable retrieval, the block is displaced within the housing due to the relocating of the cable relative to the sheave and housing opening. Such displacement of the cable sensing block actuates a dog engaging the winch sheave drive mechanism immediately preventing further rotation of the sheave in the improper direction. Correction of the direction of winch rotation automatically actuates the cable sensing block to release the winch restraining detent permitting normal operation.

The winch utilizes torque limiting means to prevent excessive cable tension consisting of a plurality of spring drive members resiliently engaging notches within a winch drive plate such that excessive resistance to cable movement permits the spring drive members to ride out of the associated notches and thereby limit the torque applicable to the winch drive mechanism.

Location of the winch housing at a mounting point spaced from the tire storage location is achievable with an embodiment of the invention by means of an elongated cable guide and extension closely receiving the cable exteriorly of the winch housing. The free end of the guide is mounted to the vehicle underside, and the guide closely supports the cable to minimize binding problems during cable extension under no load conditions.

BRIEF DESCRIPTION OF THE DRAWINGS

The aforementioned objects and advantages of the invention will be appreciated from the following description and accompanying drawings wherein:

FIG. 1 is an elevational, diametrical, sectional view of a tire carrier winch in accord with the invention, FIG. 2 is a sectional view as taken along Section II—II of FIG. 1, partially subsectioned, FIG. 3 is a sectional view through the winch housing illustrating the winch drive locking member in the nonlocking condition, FIG. 4 is a plan view of the spring finger drive plate, FIG. 5 is an elevational view of the spring finger plate of FIG. 4, FIG. 6 is a plan view of the notched drive disk, FIG. 7 is a side elevational view of the notched drive disk of FIG. 6, FIG. 8 is a detail, sectional view of the locking member illustrated in the locking position, FIG. 9 is an elevational, sectional view through the cable sensing block as taken along Section IX—IX of FIG. 10, FIG. 10 is an elevational, sectional view of the cable sensing lock as taken along Section X—X of FIG. 9, FIG. 11 is an elevational view of an embodiment of the tire carrier illustrating a cable guide and extension, FIG. 12 is a detail, plan view of the outer end of the guide as taken along Section XII—XII of FIG. 11, FIG. 13 is a detail, plan view of the cable housing and guide, partially sectioned, illustrating the attachment of the guide to the housing, FIG. 14 is a detail sectional view of the guide bracket at the winch housing as taken along Section XIV—XIV of FIG. 13, FIG. 15 is an end elevational view of the outer end of the guide as taken along Section XV—XV of FIG. 11.

DESCRIPTION OF THE PREFERRED EMBODIMENTS

A tire carrier winch in accord with the invention includes a sheet metal housing 10 formed of a cup-shaped portion 12, and a substantially planar cover portion 14, FIG. 1. These portions are staked together after the winch has been assembled by spacer rivets 16.

The cup portion 12 is provided with a lanced shaft opening 18, while the cover includes axially aligned shaft opening 20, and the openings rotatably receiving the driveshaft 22. The external portion of the shaft includes a driving connection, such as a diametrical hole 24, or other driving connection may be designed therein such as an end slot or a hexagonal head mounted upon the driveshaft for cooperation with the manual operating crank, not shown.

Internally, the winch includes a sheave 25 formed of stamp metal components including side pieces 26 and 28 maintained in spaced relationship by rivets 28 and annular spacer 30 which forms a hub upon which the cable 32 is wound, FIG. 1. The inner end of the cable is affixed to the sheave by cylindrical cable anchor 34 extending through holes defined in the sheave sides, the cable end being swaged in the anchor bore.

A primary internal drive gear 36 is attached to the sheave 25 by rivets, and the gear includes a plurality of internal teeth 38, as will be appreciated from FIG. 2.

Rotation of the gear 36 and sheave 25 is produced by rotating the driveshaft 22, and the driveshaft is drivingly connected to the sheave by means of a spring finger plate 40 keyed to the driveshaft by diametrical pin 42. The plate 40 is drivingly connected to the drive plate 44 through the interconnection of spring fingers 46 located within notches 48 formed in the drive plate, and the drive plate supports an eccentric 50 affixed to the plate within the inner opening of the drive plate hub 52. The hub 52 includes a cylindrical outer surface upon which the gear retainer plate 54 is rotatably positioned, and the retainer plate is keyed to the internal eccentric gear 56, FIG. 2, wherein rotation of the driveshaft 22 causes the gear 56 to orbit about the driveshaft, without rotating, and due to the intermeshing of the eccentric gear 56 and internal primary gear 36, the sheave will be rotated at a much slower rate than the driveshaft 22. This basic type of gear drive is similar to that shown in U.S. Pat. No. 4,059,197.

More specifically, the eccentric gear 56 is keyed to the retainer plate 54 by three tabs 58, FIG. 2, formed in the retainer plate and received within three notches defined in the gear. The retainer plate 54 is held against rotation by cooperation of the retainer plate slot 60 with the rivet 16 extending through the housing cup and cover portions. The eccentric 50 consists of a plate affixed within the drive plate hub 52 having an eccentrically located hole 62 through which the driveshaft 22 extends and as will be appreciated from FIG. 6, six radial notches 48 intersect the drive plate periphery at 60° locations.

The spring finger drive plate 40 is centrally provided with a hole for receiving driveshaft 22, and the radial notch 64 receives the driveshaft pin 42 to provide a positive drive of the plate 40. Adjacent its periphery, the plate 40 includes a plurality of spring fingers 46, tangentially disposed to the rotative movement of the plate, and the spring fingers are each deformed downwardly adjacent their terminus, FIG. 5, for frictional reception within a drive plate notch 48. The reception of the six spring fingers 46 into the six notches 48 produces a frictional driving connection between the plate 40 and drive plate 44, but upon the torque transfer between these components exceeding the frictional interconnection the spring fingers will ride out of the notches causing relative rotation between the plates producing a torque limiting connection between the driveshaft 22 and the sheave 25.

The locking means for preventing excessive sheave rotation, or the rewinding of the sheave in the wrong direction, includes the cable sensing block 66 formed of a synthetic plastic material. The block 66 is best represented in FIGS. 2, 9 and 10, and includes a channel 68 through which the cable 32 extends. The block slides against the lower housing surface 70, and the block channel 68 aligns with the housing cable opening 72, it being appreciated that the cable opening 72 is of a dimension in the plane of the sheave several times greater than the diameter of the cable.

The locking dog 74 is defined by a U-shaped sheet metal component having a base 76 engaging the housing side 70, and a tab 78 extends from the short leg of the dog into a hole 80 defined in the block 66. The other leg of the dog extends away from the housing surface 70 terminating in an abutment surface 82 disposed adjacent the periphery of finger plate 40 and in the plane thereof.

Under normal conditions, as viewed in FIGS. 2, 3 and 8, the cable 32 is wound upon the sheave 25 such that a clockwise rotation of the sheave is required to wind the cable into the housing 10. Thus, the cable is played out from the sheave from the left side of the sheave as viewed in FIGS. 2, 3 and 8 and enters the block 66 in a direction substantially shown as position A in dotted lines in FIG. 10. This angular orientation of the cable to the block 66 causes the cable to bias the block toward the left, and maintain the abutment 82 out of alignment with radial shoulder abutment surfaces 84 defined on the drive plate 44.

Upon the cable being fully unwound from the sheave 25 the cable 32 begins to pass "over center" as continued counterclockwise rotation of the sheave continues, as illustrated in FIG. 8. This movement of the cable 32 to the right, causes the block 66 to be shifted to the right simultaneously producing a rightward shifting of the dog 74 and abutment 82 placing the abutment 82 in an interfering relationship with the path of movement of the drive plate abutments 84. Thus, the next plate abutment 84 will engage the dog abutment 82 and further counterclockwise rotation of the plate 40 is prevented.

When it is desired to retract the cable 52 into the winch housing 10 clockwise rotation of the shaft 22 and plate 40 rotates the sheave to shift the cable to the left, FIG. 8, shifting block 66 to the left and displacing the dog 74 to the position of FIG. 3 permitting free rotation of the sheave drive components.

Accordingly, it will be appreciated that by the use of the block 66 and the associated dog 74 counterclockwise rotation of the sheave drive components and sheave, is prevented upon all of the cable 32 being unwound from the sheave.

A synthetic plastic filler block 86 is preferably located in the lower right hand corner of the housing 10 by rivet 16 and includes a concave surface 88 disposed adjacent the periphery of the sheave and in alignment therewith wherein the filler block aids in maintaining the cable 32 within the sheave.

In FIGS. 11–15 a variation of the tire carrier winch is illustrated wherein the point of lowering of the cable is remote from the winch itself. In the embodiment of FIGS. 1–10, the winch must be located above the location of tire storage such that the housing cable opening 72 is in line with the center of the wheel to be stored. However, if due to vehicle construction, such a mounting of the tire carrier winch is not desirable, or where it is desired to locate the winch closer to the rear bumper of the vehicle, the construction of FIGS. 11–15 may be utilized.

In this embodiment the winch is substantially identical to that previously described, and the operation and components thereof are as discussed above. The housing 90 includes an extension 92 upon which the U-shaped holder 94 is mounted by bolts 96, and the holder positions the guide or extension tube 98 relative to the housing. The guide tube includes an inner passage 100 of a diameter slightly greater than the cable 32', and an adapter 102 is affixed to the end of the guide tube for being closely received within the winch housing opening 104 through which the cable passes. As appreciated from FIG. 13, the guide tube 98 is located as to be substantially tangential to the playoff of the cable from the sheath, and minor modifications to the locking dog, not shown, may be required to accommodate the innermost portion of the adapter 102 received within the opening 104.

The outer end of the guide tube 98 is bent at a 90° angle "downwardly" terminating in an exit end 106 upon which an annular synthetic plastic bushing 108 may be affixed, if desired. A U-shaped mounting bracket 110 is affixed to the outer end of the guide tube having holes 112 mounted therein for affixing the tube outer end to the vehicle at a location above the hub of the wheel to be stored. The outer end of the cable 32' extends from the bushing 108 and the wheel carrier plate 114 is attached to the lower end of the cable by the cable stop head 116.

In this embodiment the winch housing 90 may be attached adjacent the vehicle rear bumper whereby the manual operating crank, not shown, may be easily attached to the driveshaft hex head 118 and an extended crank is not required, as is usually the case with the previously described embodiment. As guide tube 98 permits the tire to be stored at a location remote from the winch housing this embodiment is highly versatile in its installation capabilities. By relating the diameter of the guide tube passage closely to the cable diameter, kinking and binding of the cable within the guide tube is prevented, and as the bushing 108 has a close tolerance with the cable, the bushing will prevent foreign matter from entering the guide tube which might affect free movement of the cable within the tube.

It is to be appreciated that while the disclosed embodiments disclose a cable as being mounted upon the winch sheave, other strands or webs may be used, such as a metal tape, and various modifications to the inventive concepts may be apparent to those skilled in the art without departing from the spirit and scope of the invention.

We claim:

1. A tire carrier winch for mounting to the underside of a vehicle for raising and lowering a spare tire between storage and access positions comprising, in combination, a housing, a driveshaft rotatably mounted upon said housing, a sheave rotatably mounted within said housing upon said driveshaft, a strand wound upon said sheave, an opening defined in said housing in substantial radial alignment with said sheave, said strand extending through said opening, a drive member connected to said shaft drivingly connected to said sheave upon rotation of said shaft, a drive member locking member within said housing shiftable between a lock position preventing rotation of said drive member and a drive member release position, and activating means connected to said locking member located adjacent said housing opening and engaging said strand adjacent said opening, said activating means shifting said locking member from said drive member release position to said lock position upon said strand being fully unwound from said sheave.

2. In a tire carrier winch as in claim 1, said locking member activating means comprising a slide having a path of movement and having a guide channel defined therein transversely disposed with respect to said path of movement receiving said strand and aligned with said housing opening, said opening being of greater dimension in the direction of said slide path of movement than said channel whereby said strand will shift said slide in said path of movement in response to the orientation of the strand within said channel with respect to said sheave.

3. In a tire carrier winch as in claim 1, said lock member activating means comprising a block slidably supported within said housing having a channel receiving said strand.

4. In a tire carrier winch as in claim 2, wherein said drive member includes a plurality of abutment surfaces and said locking member comprises a dog movable within the path of movement of said abutments at said lock position.

5. In a tire carrier winch as in claim 4, torque limiting means interposed between said shaft and said sheave, said drive means comprising a component of said torque limiting means.

* * * * *